US006922788B2

(12) United States Patent
Eberhard et al.

(10) Patent No.: US 6,922,788 B2
(45) Date of Patent: Jul. 26, 2005

(54) LOW POWER ACCESS TO A COMPUTING UNIT FROM AN EXTERNAL SOURCE

(75) Inventors: Raymond J. Eberhard, Endicott, NY (US); James William Feeney, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 662 days.

(21) Appl. No.: 09/955,821

(22) Filed: Sep. 19, 2001

(65) Prior Publication Data

US 2003/0056131 A1 Mar. 20, 2003

(51) Int. Cl.[7] .................................................. G06F 1/32
(52) U.S. Cl. ...................................... 713/320; 713/324
(58) Field of Search ................................ 713/320, 324, 713/300

(56) References Cited

U.S. PATENT DOCUMENTS

| 4,747,041 | A | * | 5/1988 | Engel et al. ................. 713/324 |
| 4,969,830 | A | | 11/1990 | Daly et al. ................... 439/136 |
| 5,065,321 | A | | 11/1991 | Bezos et al. ............. 364/424.04 |
| 5,167,024 | A | * | 11/1992 | Smith et al. ................. 713/322 |
| 5,185,700 | A | | 2/1993 | Bezos et al. ............. 364/424.04 |
| 5,600,800 | A | | 2/1997 | Kikinis et al. ............... 395/281 |
| 5,625,673 | A | | 4/1997 | Grewe et al. ................... 379/61 |
| 5,634,080 | A | | 5/1997 | Kikinis et al. ............... 395/893 |
| RE35,590 | E | | 8/1997 | Bezos et al. ............. 364/424.04 |
| 5,664,228 | A | | 9/1997 | Mital .......................... 395/882 |
| 5,666,530 | A | | 9/1997 | Clark et al. .................. 395/617 |
| 5,802,124 | A | | 9/1998 | Bhadsavle ................... 375/377 |
| 5,894,425 | A | | 4/1999 | Saliba ....................... 364/708.1 |
| 5,928,329 | A | | 7/1999 | Clark et al. .................. 709/227 |
| 5,991,806 | A | * | 11/1999 | McHann, Jr. ................ 709/224 |
| 6,088,730 | A | | 7/2000 | Kato et al. ................... 709/227 |
| 6,105,142 | A | * | 8/2000 | Goff et al. ................... 713/324 |
| 6,125,369 | A | | 9/2000 | Wu et al. ..................... 707/201 |
| 6,134,584 | A | * | 10/2000 | Chang et al. ................ 709/219 |
| 6,477,654 | B1 | * | 11/2002 | Dean et al. .................. 713/300 |
| 6,707,867 | B2 | * | 3/2004 | Diepstraten et al. ......... 375/354 |
| 6,859,135 | B1 | * | 2/2005 | Elliott ........................ 340/7.36 |

FOREIGN PATENT DOCUMENTS

WO    WO 98/45957    10/1998

* cited by examiner

Primary Examiner—Lynne H. Browne
Assistant Examiner—Eric Chang
(74) Attorney, Agent, or Firm—Kevin P. Radigan; Arthur J. Samodovitz

(57) ABSTRACT

A method for conserving energy in a computing unit and transferring data between the computing unit and an external source. The computing unit is in a power saving mode. The method includes receiving at the computing unit a request from an external source, determining which components of the computing unit are required to respond to the request, selectively activating, from the power saving mode, the components of the computing unit necessary to respond the request, and responding to the request using the selectively activated components of the computing unit. As one example, the computing unit may comprise a laptop, and the external source may comprise a PDA, and the request may include a request from the PDA to retrieve data from or store data on the laptop.

22 Claims, 4 Drawing Sheets

LOW POWER ACCESS TO A COMPUTING UNIT FROM AN EXTERNAL SOURCE

TECHNICAL FIELD

This invention relates, in general, to the conservation of a portable power source for a computing unit and data exchange and, in particular, to selectively activating programs and databases of a computing unit in a power saving mode to retrieve or store data based on a request from an external source.

BACKGROUND OF THE INVENTION

Many people today carry laptops to work on and access or store data. However, the laptop takes a while to power up because it must go through a complex set of operations to make sure all of its components are working properly. Also, the use life of a power source, such as, for example, a battery pack, is a major concern when using a laptop.

Therefore, some people have resorted to also carrying a personal data assistant (PDA) which powers up faster and has a longer battery life. Typically, people use another computer, such as their laptop, to back up the information stored on the PDA. However, the data capacity of a PDA is limited. The laptop, on the other hand, is capable of storing a lot more data than the PDA.

Currently, information is exchanged between a laptop and a PDA by, for example, synchronizing the data between the laptop and PDA. When the two computing units are synchronizing, however, all of the components that normally operate in a laptop are powered up. This is a waste of the power source of the laptop. Also, it may be desirable to retrieve or store data in other parts of the laptop that are not normally accessed during synchronization.

In an effort to save power, power saving modes have been used to power down the computing unit after a period of inactivity. There are known techniques for managing power consumption by powering down portions of the computing unit, e.g. display, hard drive, processor, etc. However, when a laptop wakes up or when it is synchronized with a PDA, all of the components of the laptop are activated.

SUMMARY OF THE INVENTION

In view of the above, applicants have recognized that only the component(s) needed to respond to a synchronization or request from the PDA should be activated. It is therefore desirable for a laptop and PDA to share, synchronize or exchange data while minimizing or conserving the power usage of the laptop in order to extend the useful charge of its battery.

The shortcomings of the prior art are overcome and additional advantages are provided through the provision of a method for conserving power in a computing unit including a plurality of components. The method comprises, during a power saving mode, receiving at the computing unit a request from an external source, determining which components of the computing unit are required to respond to the request, selectively activating, from the power saving mode, the components of the computing unit necessary to respond to the request, and responding to the request using the selectively activated components of the computing unit.

System and computer program products corresponding to the above-summarized method are also described and claimed herein.

The method, system and computer programs described and claimed herein provide the advantage of accessing a computing unit from an external source, such as for example, another computing unit while conserving the power of the computing unit accessed.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
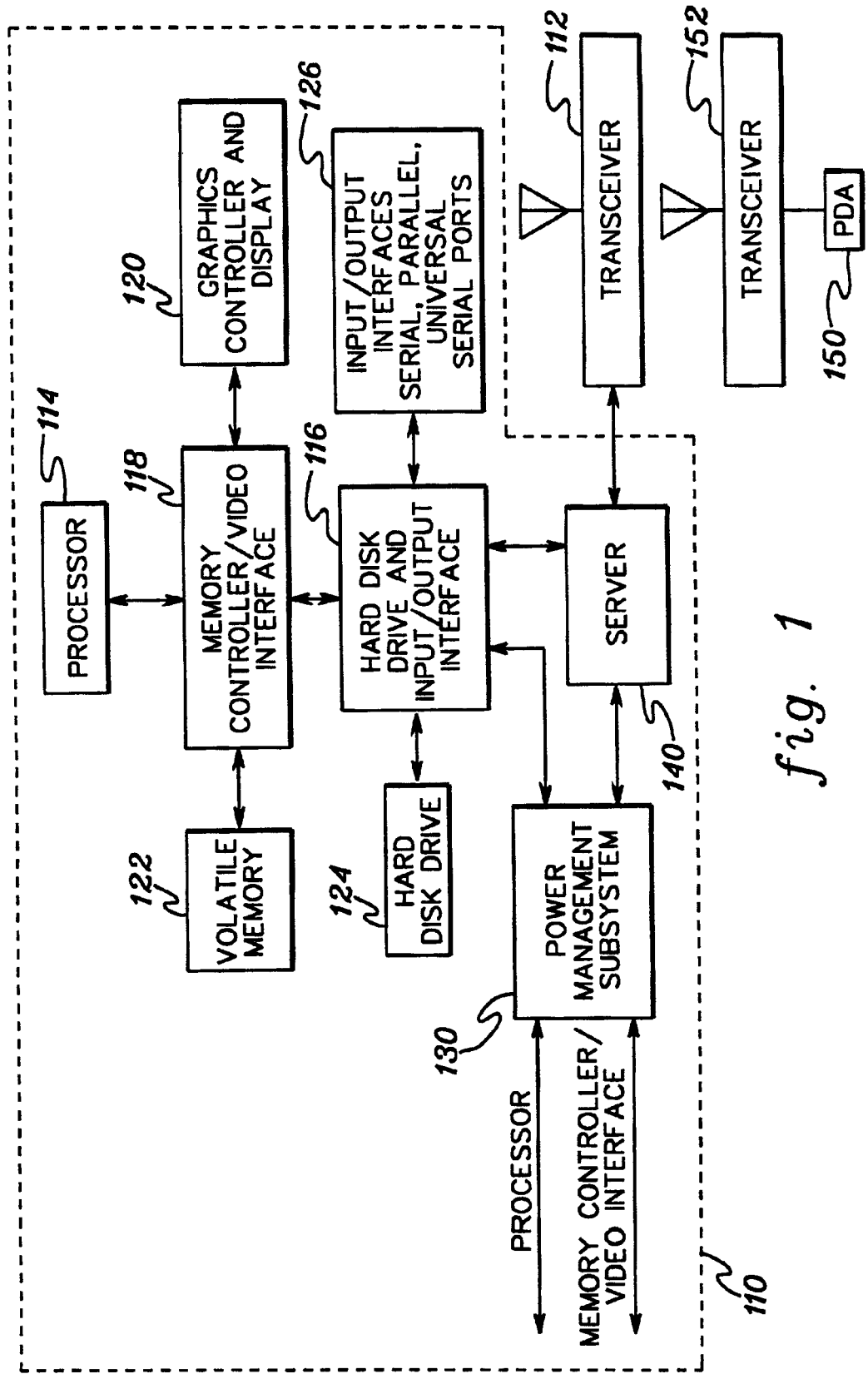
FIG. 1 depicts one example of a system architecture for a computing unit implemented in accordance with the principles of the present invention.

Referring to the figures, e.g. FIG. 1, the system architecture of one embodiment of the present invention is illustrated. As shown in FIG. 1, the system architecture for conserving power and exchanging data includes a computing unit 110 communicating with an external source 150. Initially, the computing unit is placed or assumed to be in a power saving mode.

A power saving mode reduces the power consumption of the computing unit after a period of inactivity and may include, for example, a standby mode, a suspended mode or a hibernation mode. In a standby mode, the hard disk drive is brought to a halt and the screen is blanked, but processing still continues. In a suspended mode, the clocks of the Central Processing Unit (CPU) are stopped, the hard disk drive is powered down, and the screen is blanked. In a hibernation mode, the basic input/output system (BIOS) of the computing unit writes a complete image of the random access memory (RAM) of the computing unit, plus other hardware state information, onto a specially designated file on one of the DOS partitions. After this, the BIOS powers off the system. When the system is wakened, the BIOS detects that it went into hibernation the last time, and it restores the state of the computing unit from the saved disk image.

The computing unit 110 and the external source 150 can be a wide variety of computing units such as, for example, a desktop or laptop computer, a personal data assistant (PDA), a cellular phone or the like. For simplicity reasons, the system will be described herein in reference to a notebook or laptop computer communicating with a PDA with the understanding that other computing units may be substituted in their place.

As illustrated in FIG. 1, the laptop 110 and PDA 150 communicate through transceivers 112, 152, respectively. The transceiver 152 of the PDA 150 transmits requests and data to and receives data from the transceiver 112 of the laptop 150. The transceivers 112, 152 may be separate from or formed integral with the laptop and PDA, respectively. A request from the PDA 150 can include, for example, a request for data to be retrieved from or stored on the hard disk drive. A request can also include the synchronization (e.g. HotSync® of a Palm Pilot) of information between the PDA and database backing up the information contained on the PDA. Data can include, for example, any information that is capable of being stored in and retrieved from a computing unit such as, for example, document files, reports, pictures, voice files, .pdf files, emails, spreadsheets, programs, or the like. In alternate embodiments, the request may include, for example, instructions to send a drafted email or facsimile, to completely shut off the computing unit, to print a document, to compute some numerical figures or the like.

The transceivers 112, 152 may be equipped with wireless technology to enable the laptop 110 and PDA 150 to communicate with each other. In one embodiment, the laptop 110 and PDA 152 use Bluetooth technology. Bluetooth technology enables portable or stationary electronic devices to connect and communicate wirelessly via short-range radio links. Bluetooth technology is a Radio Frequency specification for short-range, point-to-multipoint voice and data transfer. The Bluetooth specification has two power levels defined; a lower power level that covers the shorter personal area within a room, and a higher power level that can cover a medium range, such as within a home. Software controls and identity coding built into each microchip ensure that only those units preset by their owners can communicate.

The Bluetooth radio is built into a small microchip and operates in a globally available frequency band ensuring communication compatibility worldwide. The tiny Bluetooth microchip, incorporating a radio transceiver, is built into digital devices. The Bluetooth technology makes all connections quickly and without the need for cable.

Bluetooth facilitates fast and secure transmission of both voice and data, even when the devices are not within line of sight. The Bluetooth technology supports both point-to-point and point-to-multipoint connections. Its nominal link range is from 10 centimeters to 10 meters, but can be extended to 100 meters by increasing the transmit power.

With the current specification, up to seven 'slave' devices can be set to communicate with a 'master' radio in one device. Several of these 'piconets' can be established and linked together in ad hoc 'scatternets' to allow communication among continually flexible configurations. All devices in the same piconet have priority synchronization, but other devices can be set to enter at any time. The topology can best be described as a flexible, multiple piconet structure.

Bluetooth technology is designed to be fully functional even in very noisy radio environments and its voice transmissions are audible under severe conditions. The technology provides very high transmission rate and all data are protected by advanced error correction methods, as well as encryption and authentication routines for user protection. Further information about Bluetooth Technology is set forth in the Specification of the Bluetooth System, v.1.0B, Dec. 1, 1999, which is incorporated herein by reference.

In another embodiment, the wireless technology uses Infrared Data Association (IrDA), such as IrDA-Data, IrDA-Control, Air or the like. IrDA provides wireless connectivity technologies for devices that would normally use cables for connectivity. IrDA is a point-to-point, narrow angle (30 degree cone), ad-hoc data transmission standard designed to operate over a distance of 0 to 1 meter and at speeds of 9600 bps to 16 Mbps. The short-range, narrow angle of IrDA allows the user to aim, in a point-and-shoot style at the intended recipient.

A typical laptop includes a plurality of components, such as, for example, a processor 114, a hard disk drive/input-output hub interface 116, and memory controller and video interface 118. Each of these components may be coupled to each other and/or control other separate, additional hardware components of the laptop 110. For example, the memory controller 118 may connect to the graphics controller and display 120 and the volatile memory 122 of the laptop 110. Also, the hard disk drive/input-output hub interface 116 may connect to the hard disk drive 124 and the input-output interfaces 126 which may include, for example, serial, parallel, or universal serial bus ports or the like.

The laptop 110 also includes a power management subsystem 130 and a server 140. The server 140 and the components of the laptop 110 are coupled to the power management subsystem 130. The power management subsystem 130 manages the power distribution to the separate components of the laptop 110 by controlling the power distribution to the separate components through separate lines that exit the power management subsystem 130 and connect to the components. Different lines out of the power management subsystem 130 may carry different voltages. In another embodiment, the power management subsystem 130 can deliver control signals to the sources of power for the individual components of the laptop, selectively enabling or disabling their source of power. This embodiment would eliminate having to route the power distribution through one block which could present many physical, electrical, thermal and other challenges. The power management subsystem 130 is capable of activating the separate components of the laptop based on instructions received from the server 140.

The server 140 acts as an intermediary between the PDA 150 and the various hardware components of the laptop 110 and may communicate directly with the most immediate or adjacent hardware components coupled to the server 140. The server 140 is an input/output device, for instructions and data, including code contained on one or more chips. The server 140 acts as an interpreter to translate requests from the PDA 150 into operation instructions that the different components of the laptop 110 can utilize to carry out their functions.

The server 140 is also capable of determining which components of the laptop 110 should be selectively activated to respond to a request from the PDA 150. Based on this determination, the server 140 may transmit a control signal to the power management subsystem 130 to activate only the components of the laptop 110 necessary to process the request.

The server 140 also maintains a set of instructions to support a desired transaction or operation and is capable of sending these instructions to the controllers of the separate components of the laptop 110 in order to respond to the request. The component controllers translate the instructions received from the server 140 into electrical signals that operate the component. For example, a hard disk drive controller would send electrical signals to move the disk driver's read/write heads to the proper location in the hard disk drive to, for example, retrieve or save data in response to a request from the PDA 150.

In alternate embodiments, if the instructions to command certain components of the laptop 110 are not among those stored in the server's memory, the server 140 may either retrieve the instructions from a component driver, which contains its own level of code tailored to control a specific component, or transmit instructions to the component driver to instruct the component controller itself. The component driver would, in turn, instruct the controller of the specific component to perform the desired operation. In this embodiment, the component driver 140 becomes an extension of the server. Without the component drivers, the server 140 would have to include all the commands for every piece of hardware or component of the laptop 110.

In yet another embodiment, the server 140 may use the Random Access Memory (RAM) or an operating system, such as, for example, Windows® from Microsoft, to assist in responding to the request. Although, the use of RAM or an operating system would require the powering up of the processor 114. However, the power of the laptop 110 may still be conserved by not powering up the video display (e.g. monitor) or other components that would not be required to respond to the request.

FIGS. 2–4 illustrate one example of the process of requesting that data be retrieved from or stored on the hard disk drive 124 of the laptop 110.

Figure 2A:
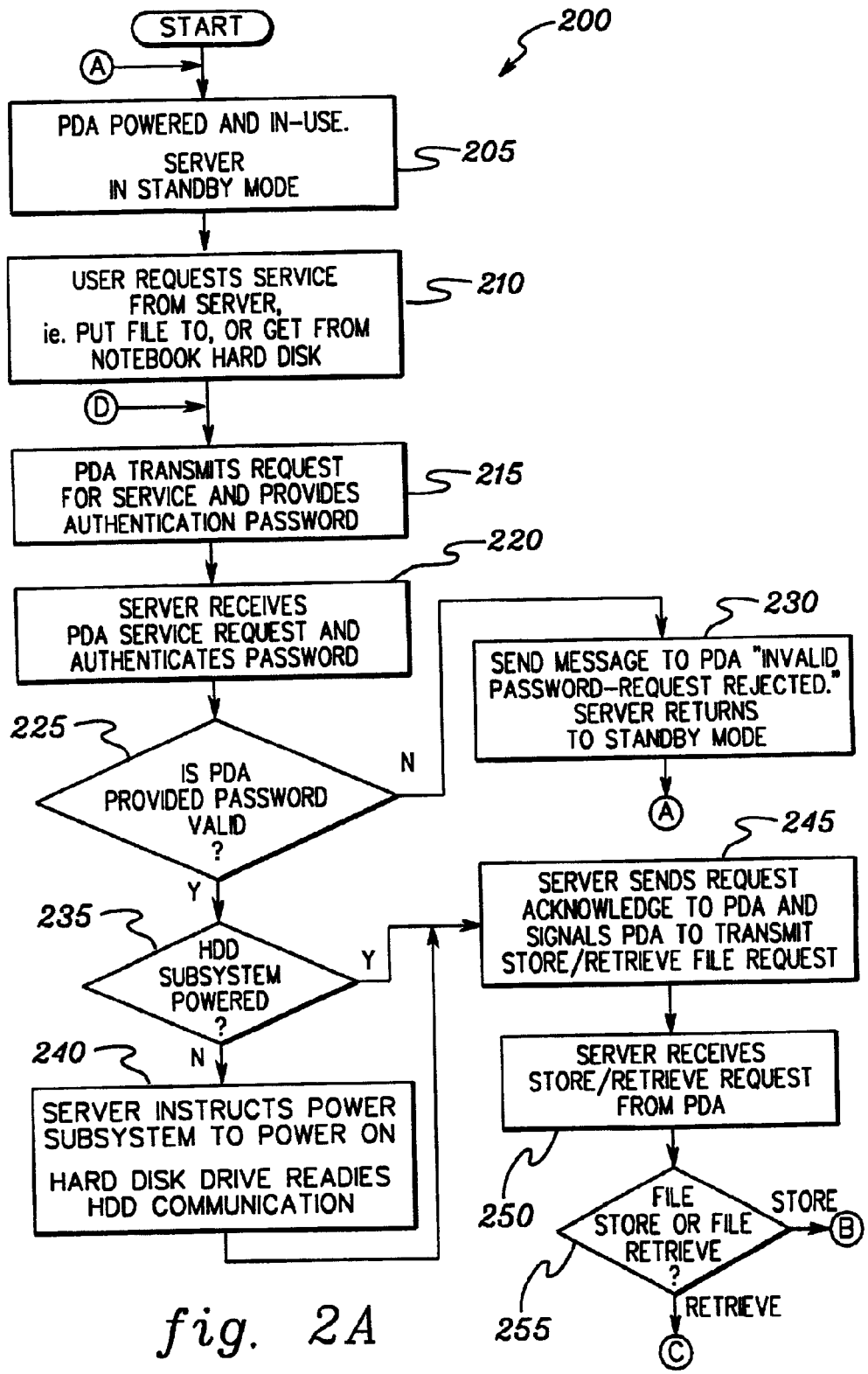
FIG. 2A is a flowchart of one embodiment of a process for authenticating and determining the nature of a service request by the system of FIG. 1.

FIG. 2A is one example of a flowchart for initializing 200, the system for data exchange and conserving energy. Processing begins with the laptop in a power saving mode and the server 140 in a standby power saving mode 205. The server interface is in a standby mode capable of detecting, accepting and reacting to signals or transmissions from the PDA 150 with all other circuitry and programs of the computing units, in a standby, suspended or hibernation power saving mode.

The PDA 150 wakes up the server 140 out of the standby mode by sending a service request (step 210) from the transceiver 152 of the PDA 150 which is received by the transceiver 112 of the laptop 110. In one embodiment, the request contains a level of protection against unauthorized users. For example, the service request may initially include security information, such as, for example, a user-id and/or password, which is authenticated by the server before access is granted to the laptop (step 215). In an embodiment using Bluetooth technology, the radio signal may contain a security code previously stored in the PDA 150 and laptop 110 that is encrypted and exchanged between the two devices before the powering up and data exchange operations are performed.

If the security information is invalid, the server may transmit a message back to the PDA through the transceivers rejecting or denying access because of an invalid password. (step 230). Return is made to the initial state 205 and the server may continue to receive and verify security information contained in a service request until the security information provided is valid.

Once access is granted or the security information is approved, the server 140 determines from the service request which component(s) of the laptop 110 are required to be powered up in order to respond to the request. Based on this determination, a control signal is sent from the server 140 to the power management subsystem 130 to power up only the necessary component(s) required to respond to the request, if they are not already powered. For example, if the request requires data be retrieved from the hard disk drive 124 of the laptop 110 and the server 140 contains the specific set of instructions to perform that operation, the power management subsystem 130 powers (in step 240) only the hard disk drive\input-output hub interface 116 and the hard disk drive 124, including the disk drive controller, and any other components necessary to retrieve data from or store data in the hard disk drive 124. If the specific set of instructions are not contained in the server's memory, the power management subsystem 130 is required to power up the component controlling the component driver or operating system to assist the server.

If the necessary component(s) of the laptop are already powered up (e.g. determined by inquiry 235) or were powered up in step 240 by the power management system, the server 140 may transmit an acknowledgment to the PDA 150 signaling the PDA to transmit its specific request to the server 140 (step 250).

In one embodiment, the request from the PDA 150 includes a request to retrieve or store data in a specific folder on the hard disk drive. The request may include the designation of a specific directory path on the hard disk drive 124 for the data to be found or stored. The specific location may contain, for example, the specific drive, file name, and any applicable folder names or sub-folder names(e.g. c:\folder\document).

In an alternate embodiment, the server 140 may transmit a query which directs the user to input search words to aid the server in determining, for example, where to locate or store a particular file. The query may include, for example, fields relating to file name, hard disk drive location, or the like. The specific file location or query results are then transmitted by the PDA through the transceivers to the server to be processed. The server sorts and filters the words in order to, for example, ask the database to locate or store a file.

In yet another embodiment, the server 140 transmits a directory of file locations to the PDA 150 so that the PDA user may identify the specific location that the data should be retrieved from or stored in. Once the user determines the location, the PDA, through the transceiver 152, transmits the specific location, which includes the specific directory path, back to the laptop server 140.

The server 140 may check to make sure that there are no problems with the directory path, file name or location selected. For example, the server makes sure that the drive or file name is an acceptable one, and that the user is not trying to save over an existing file.

Next, the server determines the specific nature of the service request. For example, the server determines in step 255 whether the request is to retrieve data from one of the components or store data in one of the components of the laptop.

Figure 2B:
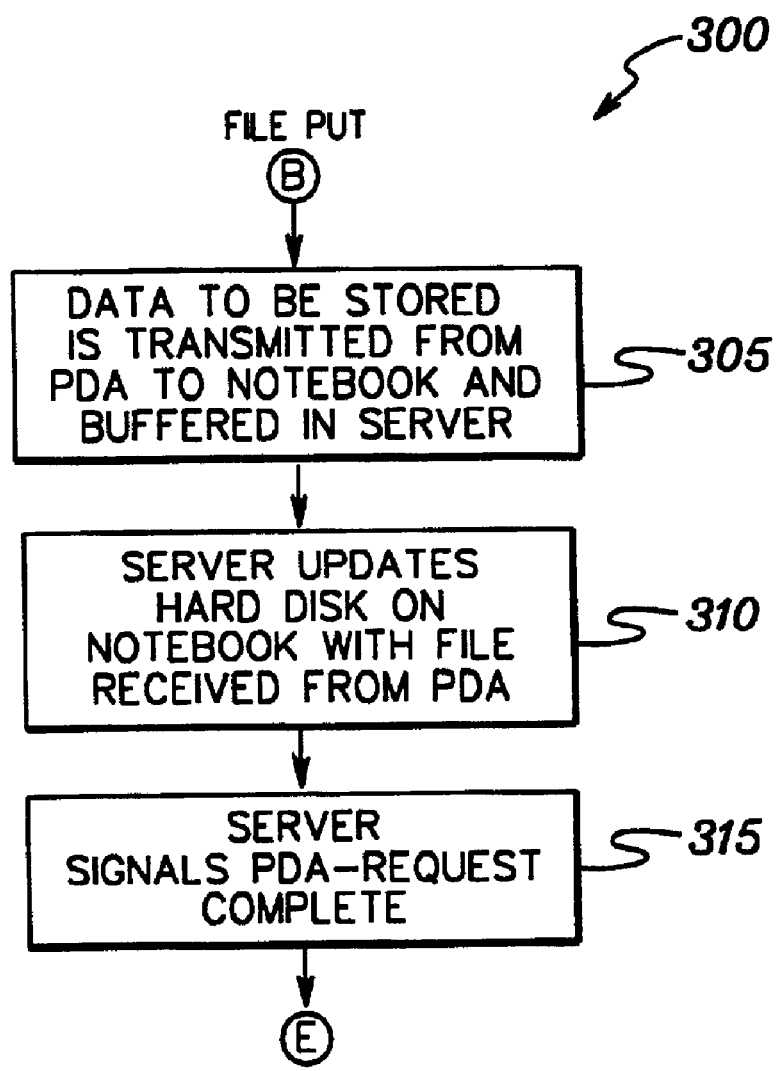
FIG. 2B is a flowchart of one embodiment of a process for storing data by the system of FIG. 1.

FIG. 2B is one example of a flowchart for storing data on the hard disk drive of the laptop received from a PDA. In step 305, the data to be stored is transmitted from the PDA and received by the server through the transceivers 152, 112. The server, with the aid of the hard disk drive controller, then transmits the data to the location designated in the service request so that the data may be stored (step 310).

In one embodiment, the data updates a file already existing on the hard drive. In this embodiment, the server may transmit a signal to the PDA requesting whether the user wishes to save over or replace the existing file, or designate or chose another location in the laptop. In alternate embodiments, the server may create a separate file or version designation to store the file near the same location as the existing file.

Figure 2C:
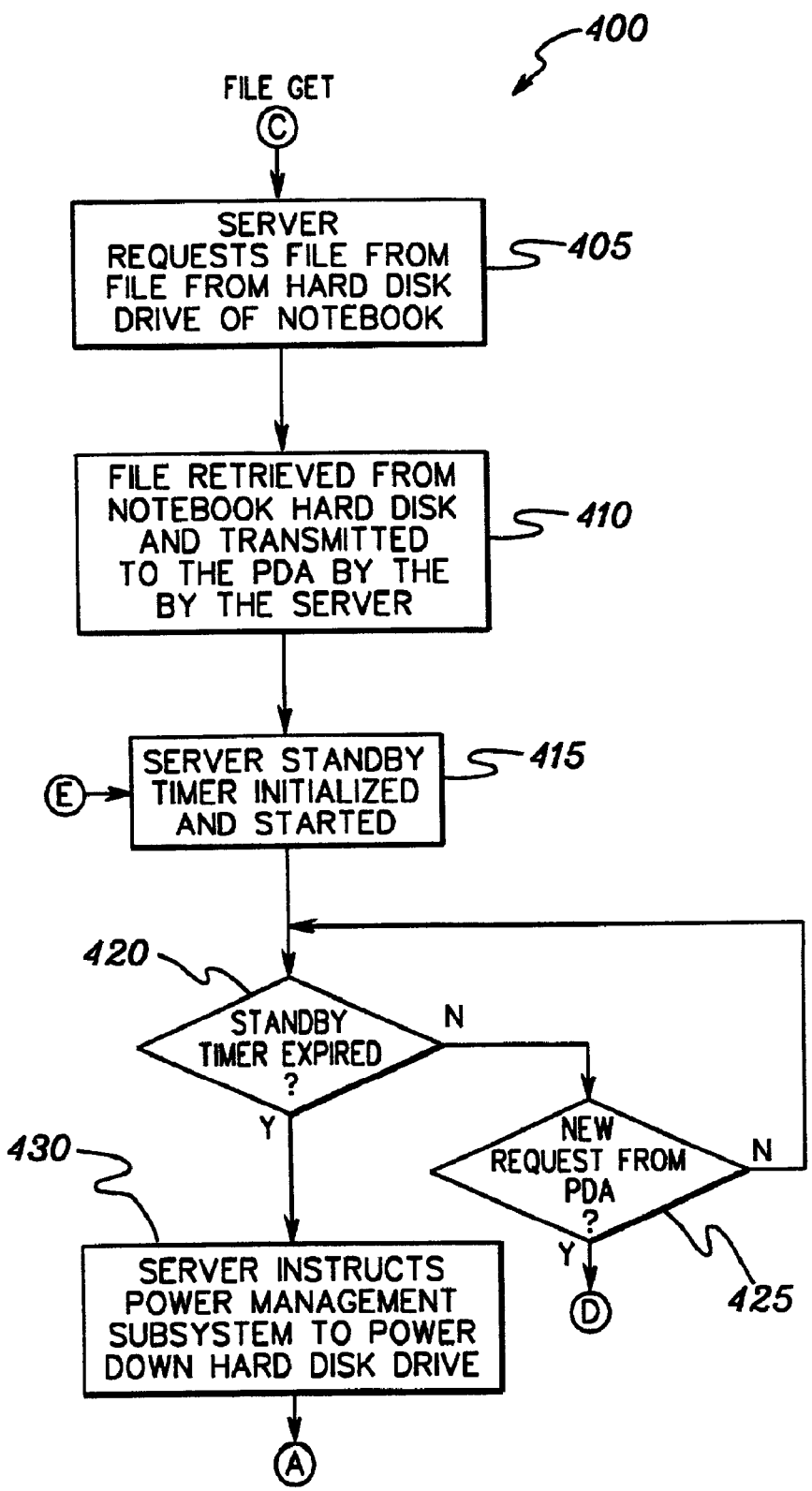
FIG. 2C is a flowchart of one embodiment of a process for retrieving data and other requests as well as returning the system to a power saving mode by the system of FIG. 1.

FIG. 2C is one example of a flowchart for retrieving data stored on the hard disk drive of the laptop and initializing a standby timer for the server. The server, with the assistance of the hard disk drive controller, requests the file from the hard disk drive (step 405), and then retrieves the file from the location on the laptop and transmits the file to the PDA through the transceivers (step 410).

After the data is stored on or retrieved from the hard disk drive 124, the server 140 may transmit a confirmation to the PDA 150 that the service request is complete (e.g. step 315).

After a response to the request is completed, the server 140 may initialize and start a standby timer for a pro-grammed period of time 415. The standby timer avoids having to power down the components used to process the request for a specified period of time while another request is being or will be transmitted shortly during a pre-programmed period of time. Inquiry 420 determines whether time has expired. If the time has not expired, the server determines whether a new request is received by transceiver 112 (Inquiry 425). If "yes", the server returns to authenti-cation 215 to verify the incoming request source. When the pre-programmed period of time expires, the server instructs the power management subsystem to return all of the components of the laptop used to respond to the service request or requests to the previous power saving mode 430. At the same time, the server returns to its standby mode 205.

Since only the component(s) necessary to respond to a request should be powered up by the power management subsystem 130, the laptop 110 is conserving power and the battery life of the laptop is extended.

The present invention may be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capa-bilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for conserving power in a computing unit, the computing unit including a plurality of components, the method comprising:

during a power saving mode, receiving at the computing unit a request for service from a wirelessly coupled, portable external source, wherein the request for ser-vice comprises a request to save data on one of the components of the computing unit or a request to retrieve data from one of the components of the com-puting unit;

determining which components of the computing unit are required to respond to the request for service while maintaining the power saving mode;

selectively activating, from the power saving mode, the components of the computing unit necessary to respond to the request, wherein the components do not include a central processing unit of the computing unit;

receiving at the computing unit file location information from the external source to facilitate processing of the request by the selectively activated components of the computing unit; and responding to the request using the file location informa-tion and the selectively activated components of the computing unit.

2. The method of claim 1, wherein the request comprises a request to synchronize data between the computing unit and the external source.

3. The method of claim 1 further comprising, prior to receiving the request, placing the computing unit in a power saving mode.

4. The method of claim 1 further comprising returning the components of the computing unit to the power saving mode after responding to the request.

5. The method of claim 1, wherein only the components necessary to respond to the request are activated.

6. The method of claim 1, wherein responding to the request comprises transmitting instructions to the activated components necessary to respond to the request.

7. The method of claim 6, wherein the instructions include retrieving data stored in one of the activated components.

8. The method of claim 6, wherein the instructions include storing data in one of the activated components.

9. The method of claim 1, wherein receiving the request comprises authenticating the source of the request.

10. A system for conserving power in a computing unit, the computing unit including a plurality of components, the system comprising:

during a power saving mode, means for receiving at the computing unit a request for service from a wirelessly coupled, portable external source, wherein the request for service comprises a request to save data on one of the components of the computing unit or a request to retrieve data from one of the components of the com-puting unit;

means for determining which components of the comput-ing unit are required to respond to the request for service while maintaining the power saving mode;

means for selectively activating, from the power saving mode, the components of the computing unit necessary to respond to the request wherein the components do not include a central processing unit of the computing unit;

means for receiving at the computing unit file location information from the external source to facilitate pro-cessing of the request by the means for selectively activated components of the computing unit; and means for responding to the request using the file location information and the selectively activated components of the computing unit.

11. The system of claim 10, wherein the request comprises a request to synchronize data between the computing unit and the external source.

12. The system of claim 10, wherein the plurality of components are in a power saving mode before the request is received.

13. The system of claim 10, wherein the means for selectively activating the components of the computing unit activates only the components necessary to respond to the request.

14. The system of claim 10, further comprising means for transmitting instructions to the activated components nec-essary to respond to the request.

15. Computer executable software code stored on a computing unit readable medium, the code for conserving power in a computing unit, the computing unit including a plurality of components, the code comprising:

during a power saving mode, code to receive at the computing unit a request for service from a wirelessly coupled, portable external source, wherein the request for service comprises a request to save data on one of the components of the computing unit or a request to retrieve data from one of the components of the computing unit;

code to determine which components of the computing unit are required to respond to the request for service while maintaining the power saving mode;

code to selectively activate, from the power saving mode, the components of the computing unit necessary to respond to the request, wherein the components do not include a central processing unit of the computing unit;

code to receive at the computing unit file location information from the external source to facilitate processing of the request by the selectively activated components of the computing unit; and code to respond to the request using the file location information and the selectively activated components of the computing unit.

16. The code of claim 15, wherein the request comprises a request to synchronize data between the computing unit and the external source.

17. The code of claim 15, wherein the plurality of components are in a power saving mode before the request is received.

18. The code of claim 15, wherein the code for selectively activating the components of the computing unit activates only the components necessary to respond to the request.

19. The code of claim 15, further comprising code for transmitting instructions to the activated components necessary to respond to the request.

20. A computing unit comprising:

a central processing unit and a plurality of components in a power saving mode, each of said plurality of components being configured to perform specific functions of the computing unit;

a power management subsystem coupled to said plurality of components, said power management system being capable of activating from the power saving mode at least one of said plurality of components; and a server, said server being adapted to receive a request for service from a wirelessly coupled, portable external source, wherein the request for service comprises a request to save data on one of the components of the computing unit or a request to retrieve data from one of the components of the computing unit, and to determine therefrom which component of said plurality of components other than the central processing unit should be activated by the power management subsystem to respond to the request; and wherein the server is further adapted to receive file location information from the external source to facilitate processing of the request.

21. The computing unit of claim 20, wherein the request comprises a request to synchronize data between the computing unit and the external source.

22. The computing unit of claim 20, wherein the power management subsystem is instructed to activate only the components necessary to respond to the request.

* * * * *